Figure 1:
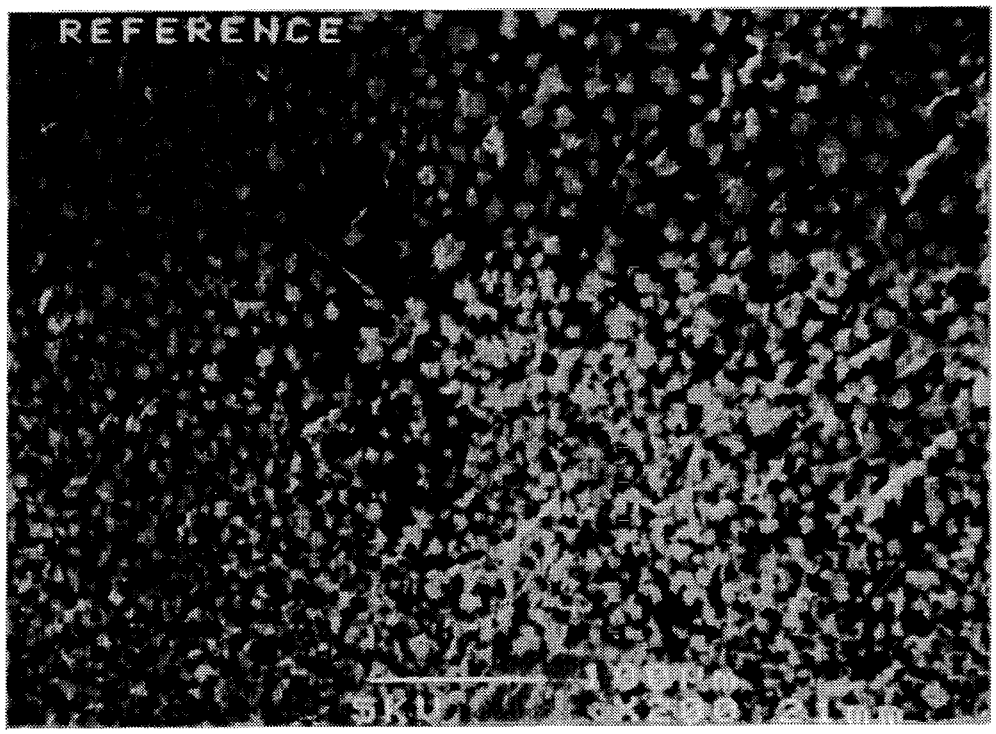

United States Patent [19]
Burgoyne et al.

[11] Patent Number: 5,510,419
[45] Date of Patent: Apr. 23, 1996

[54] POLYMER-MODIFIED RUBBER COMPOSITION

[75] Inventors: Michael D. Burgoyne, Georgetown; James F. Fisher; James R. Jury, both of Brampton, all of Canada

[73] Assignee: National Rubber Technology Inc., Toronto, Canada

[21] Appl. No.: 305,976

[22] Filed: Sep. 16, 1994

[51] Int. Cl.$^6$ ............................ C08F 12/08; C08F 112/08
[52] U.S. Cl. ............................... 525/98; 525/95; 525/99; 525/331.5; 525/333.3
[58] Field of Search ........................ 525/98, 99, 95, 525/331.9, 333.3

[56] References Cited

U.S. PATENT DOCUMENTS

| | | | |
|---|---|---|---|
| 3,673,133 | 6/1972 | Schmidt | 260/2.5 L |
| 4,028,288 | 6/1977 | Turner | 260/2.3 |
| 4,256,850 | 3/1981 | Thorsrud | 521/139 |
| 5,010,122 | 4/1991 | Koski | 524/80 |
| 5,039,714 | 8/1991 | Kasahara et al. | 521/148 |
| 5,145,877 | 9/1992 | Bopp et al. | 521/40 |
| 5,166,221 | 11/1992 | Hahn et al. | 521/59 |

OTHER PUBLICATIONS

"Tech Book Facts—Pliolite", Goodyear Chemicals, PLR-1-1 to PLR-1-4.
"Vestenamer" Struktol Company Limited, Aug. 1989 pp.1–10.

*Primary Examiner*—Paul J. Thibodeau
*Assistant Examiner*—Mary Critharis
*Attorney, Agent, or Firm*—Ridout & Maybee

[57] ABSTRACT

A polymer-modified rubber composition is formed by blending together about 5% to about 60% vulcanized styrene-butadiene rubber crumb; about 5% to about 60% uncured rubber; about 5% to about 30% styrene-based thermoplastic resin; about 1% to about 10% homogenizing agent adapted to facilitate blending of aromatic-based with non aromatic-based polymers; and about 1% to about 10% curing agent for the uncured rubber; to form a blend wherein the thermoplastic resin (c) is substantially homogeneously blended with the rubbers (a) and (b). All major components of the composition may be derived from the post industrial and post consumer waste stream. The compositions have excellent physical properties, especially stiffness and stiffness retention at elevated temperatures.

16 Claims, 3 Drawing Sheets

POLYMER-MODIFIED RUBBER COMPOSITION

The present invention relates to polymer-modified rubber compositions incorporating cured rubber crumb.

It is known to form curable rubber compositions comprising cured rubber crumb, or finely divided vulcanized rubber, blended with a curable elastomeric binder. The rubber crumb may, for example, be obtained from comminution of tires, such as passenger car tires. The binder may comprise, for example, a curable polymer such as a styrene-butadiene rubber composition. These compositions can be molded and cured to form a wide variety of useful articles especially where high strength properties are not required. As compared with corresponding products made wholly from virgin rubber, the products can be made at relatively low cost because of the content of low cost recycled rubber crumb.

In the conventional products, the cured rubber crumb functions essentially as a rubbery inert filler, and the products, especially those with relatively high contents of cured rubber crumb, tend to be relatively softer and flexible. However, for some products a certain degree of rigidity is required. For example, rubber mud flaps for vans, trucks and like vehicles need to be resistant to "sailing" in order to function effectively. Applicants have attempted increasing the stiffness of the compositions by adding friable granular styrene-butadiene copolymers having a high styrenic content, such as PLIOLITE S6B (trademark) along with the rubber binder but this significantly increases the cost of the products. It is also possible to increase the rigidity by adding fibrous reinforcement but this tends to result in fibers exposed at the surface of the product which provide an aesthetically unattractive appearance and make it difficult or impossible to tear trim the molded products.

Further, it has been found that products wherein increased stiffness is achieved by addition of the high styrenic copolymer referred to above do not exhibit properties of stiffness retention and resistance to deformation at elevated temperatures above about 150° F. that are as great as may be considered desirable.

U.S. Pat. No. 4,028,288 (Turner) discloses forming heat and pressure molded products from a mixture of vulcanized rubber particles, such as particalized tires, including the fibrous cord content thereof, and particalized plastic resin waste. The products are relatively porous and incompletely homogeneous and comprise voids as well as melted material bonded to identifiable rubber bits per se. Such grossly inhomogeneous material lacks sufficient coherency to be capable of being formed into sheets by conventional sheeting procedures and is therefore unusable in most of the applications in which known curable rubber compositions comprising cured rubber crumb, or finely divided vulcanized rubber, are employed.

The applicants have now found that it is possible to blend styrene-based thermoplastic resin with the vulcanized crumb and uncured rubber to form homogeneous blends in the presence of a homogenizing agent and these blends are capable of being cured and molded to yield products having excellent stiffness and other excellent physical properties, and stiffness retention at elevated temperature.

The present invention provides a polymer-modified rubber composition formed by blending together: (a) about 5% to about 60% vulcanized styrene-butadiene rubber crumb; (b) about 5% to about 60% uncured styrene-based thermoplastic resin rubber; (c) about 5% to about 30% styrene-based thermoplastic resin; (d) about 1% to about 10% homogenizing agent adapted to facilitate blending of aromatic-based with non aromatic-based polymers; and (e) about 1% to about 10% curing agent for said uncured rubber; and forming a blend wherein said thermoplastic resin (c) is substantially homogeneously blended in said (a) and (b); all said percentages by weight based on the total weight of the composition.

Advantageously, the compositions of the invention can contain greatly increased contents of tire crumb, or other finely divided vulcanized rubber, while exhibiting, after curing, properties, especially stiffness properties, similar to new or virgin rubber compositions, and at least equal to those of analogous compositions having contents of high styrenic copolymers. Surprisingly, the compositions of the invention have been found to exhibit properties of stiffness retention and resistance to deformation at elevated temperatures above about 150° F. that are significantly greater than those of such analogous compositions containing high styrenic copolymers. The reason for this is presently not fully understood, but, without wishing to be bound by any theory, is believed to be related to the higher softening point of thermoplastic resins generally as opposed to that of the high styrenic copolymer.

Advantageously, all the major components of the present compositions may be derived from the post industrial and post consumer waste streams thus providing at least a partial solution to the problems of disposal of these materials as well as taking advantage of the ready availability and generally low cost of these materials.

The vulcanized styrene-butadiene rubber crumb used in the present composition may be obtained by grinding or otherwise comminuting any source of vulcanized styrene-butadiene rubber compound, such as road vehicle tires, roofing membrane, hose, gaskets and the like, and is preferably obtained from recycled passenger car tires using any conventional procedure. Any steel or other metallic inclusions should be removed from the ground car tires before use in the compositions of the invention. Preferably, since the compositions of the invention are preferably fiber-free, all fibrous material such as tire cord fibers is preferably likewise removed from the ground rubber using conventional separation procedures before use in the compositions of the invention. Desirably, the vulcanized rubber crumb is of a particle size in the range about 10 to about 80 mesh (Tyler standard sieve). The use of rubber crumb of a particle size substantially coarser than about 10 mesh tends to result in cured products which are insufficiently homogeneous and tend to have relatively poor strength properties. The use of crumb which is substantially finer than about 80 mesh tends to significantly increase the energy costs of the comminution operation, without significant improvement of the properties of the compositions. As noted above, desirably the compositions of the invention comprise about 5 to about 60 weight percent of the vulcanized rubber crumb. Compositions comprising greater than about 60% by weight of the cured rubber crumb tend to be relatively soft and to have poor strength properties, while compositions containing less than about 5% of the rubber crumb tend to be excessively expensive, as a result of their low content of the relatively low cost cured rubber crumb material. Preferably, the composition comprises about 10 to about 50% by weight of the rubber crumb, more preferably about 20 to about 40%.

The styrene-based thermoplastic resin, when blended homogeneously with the vulcanized and uncured rubber components, serves to provide the blend with stiffness properties. The term "thermoplastic resin" as used herein is to be understood as it would be understood by those skilled in the art as referring to polymeric materials having a linear macromolecular structure that will repeatedly soften and harden when cooled. The term "styrene-based" as used herein is to be understood broadly as it would be understood by those skilled in the art as referring to homopolymers and copolymers of styrene. Examples of such styrene-based thermoplastic resins include ABS (acrylonitrile-butadiene-styrene copolymers), m ABS (modified ABS), ASA (acrylonitrile-styrene-acrylic copolymer), MBS (methacrylate-butadiene-styrene copolymer), polystyrene, SAN (styrene-acrylonitrile copolymer), and mixtures thereof. Thermoplastic resins, as understood by those skilled in the art, have properties of coherency, hardness and stiffness which distinguish them from granular friable polymers such as the waxy non-resinous PLIOLITE SGB material referred to above. For example, thermoplastic resins are not friable under normal hand pressure.

Usually the styrene-based thermoplastic resins used herein will have a flexural modulus at 73° F. (as measured by ASTM D790) in the range about $65 \times 10^3$ to about $800 \times 10^3$ p.s.i., more preferably about $100 \times 10^3$ to about $700 \times 10^3$ p.s.i., still more preferably about $130 \times 10^3$ to about $600 \times 10^3$ p.s.i.

Preferably the styrene-based thermoplastic resin contains at least about 25% styrene by weight based on the weight of said styrene-based thermoplastic resin.

In one particularly preferred form the styrene-based thermoplastic resin is polystyrene which may be any form of polystyrene, for example it may be in the form of particles of crystal polystyrene, but more preferably is in the form of discarded polystyrene foam such as can be separated from the waste stream as coffee cups, egg cartons, packaging, insulation and other waste polystyrene foam articles. The polystyrene foam material has been found to melt and blend into the mixture more easily than other thermoplastics and other forms of polystyrene such as crystal polystyrene. It appears this is because of the larger surface area of the foamed material. In the case in which foam polystyrene is used, the foamed material is preferably roughly ground and compacted or densified, for example to form densified pieces about one-quarter inch in diameter, to facilitate handling before blending into the composition.

As indicated above, desirably the compositions of the present invention contain about 5% to about 30% styrene-based thermoplastic resin by weight. The compositions containing less than about 5% styrene-based thermoplastic resin tend to be excessively soft and flexible, and do not exhibit desired stiffness properties. The compositions containing greater than about 50% by weight styrene-based thermoplastic resin tend to be somewhat brittle and to have relatively low impact strength. Preferably, the compositions contain about 10 to about 25% by weight of styrene-based thermoplastic resin, still more preferably about 10 to about 20% by weight of styrene-based thermoplastic resin.

In the present compositions, the uncured rubber component serves the function of binding the other components together to form a coherent blend. The term "rubber" as used herein is to be interpreted broadly, as it would be understood by those skilled in the art, to mean natural rubber and all natural or synthetic polymers having mechanical properties similar to the properties characteristic of natural rubber, namely deformability, rapid recovery from deformation, and mechanical strength. Examples of such materials include natural rubber, styrene-butadiene rubber, polybutadiene, polyisoprene, polyisobutylene, isoprene-butadiene copolymer, neoprene, nitrile rubber, butyl rubber, polysulfide elastomers, acrylic elastomers, silicone rubbers, polyester rubbers, diisocyanate-linked condensation elastomers, EPDM (ethylene-propylene diene rubbers), EPT (ethylene-propylene terpolymer rubbers), crosslinked ethylenevinylacetate polymers, crosslinked polyethylene, and mixtures thereof. All such rubber materials in uncured, or curable, form are contemplated for use as the binder in the compositions of the invention. That is to say, the term "uncured" as used in the present specification is to be understood broadly as it would be understood by those skilled in the art to refer to materials capable of undergoing vulcanization or crosslinking. It does not exclude a certain degree of vulcanization or crosslinking present in the starting material. The degree of curing or crosslinking of a particular rubber material may be determined by standard tests well known to those skilled in the art. For example, conventionally the degree of cure or vulcanization of a natural rubber or styrene-butadiene rubber compound is determined by comparing its tensile strength before and after undergoing further curing under standard conditions. A material which undergoes no increase in tensile strength is 100% cured, while increases in tensile strength indicate various degrees of lack of cure. Other materials, for example crosslinked polyethylene, are amenable to solubility testing. A polyethylene which is 100% soluble in a solvent therefor, such as decalin, is regarded as 0% crosslinked, a material which is 0% soluble therein is 100% crosslinked, and intermediate degrees of solubility indicate intermediate degrees of curing or crosslinking. As indicated above, the compositions of the invention should contain at least about 5% by weight uncured rubber, in order to allow the components to be bonded together to form a coherent blend. Desirably, the composition does not contain more than about 60% by weight of uncured rubber. The uncured rubber material tends to be relatively expensive as compared with the vulcanized rubber crumb and styrene-based thermoplastic resin materials, and contents of uncured rubber are greater than about 60% tend to significantly increase the cost of the compositions, without any corresponding increase in the ease of combining the ingredients. Preferably, the composition comprises about 10 to about 30% by weight of the uncured rubber, still more preferably about 10 to about 20% by weight of uncured rubber.

In one especially preferred form the uncured rubber comprises styrene-butadiene rubber and contains about 25% to about 75% by weight of styrene based on the weight of the uncured styrene-butadiene rubber. The styrene moiety of the copolymer can advantageously serve to facilitate the homogenous blending of the styrene-based thermoplastic into the rubber ingredients, and in some cases it may be difficult to achieve adequate homogeneity of the blend if it has an excessively low styrene content.

In the case in which the uncured rubber is uncured styrene-butadiene rubber, this may, for example, be in the form of scrap or waste uncured rubber compound from the manufacture of passenger car tires. This material, often referred to as "mill room compound" or "masticated rubber"in addition to containing uncured styrene-butadiene rubber, will usually contain processing oils, curing agents and fillers. These materials are, however, at least compatible with the ingredients of the present composition, and often their presence is desirable in the present composition, and therefore the presence of these materials does not detract from the usability of the waste or recycled material in the compositions of the present invention. Uncured styrene-butadiene rubber and other uncured rubber material obtained from any other source, such as waste material from manufacturers, may, of course, be used in the compositions of the present invention.

The composition of the invention also contains about 1% to about 10% of homogenizing agent adapted to facilitate blending of aromatic-based with non-aromatic-based polymers. Such homogenizing agents are in themselves well known to those skilled in the art and are used in numerous applications where it is desired to form homogenous blends of non-aromatic polymers with aromatic-based polymers. In the compositions of the invention, these homogenizing agents serve to facilitate the blending of the styrene-based thermoplastic resin, which has the character of an aromatic-based polymer, into the rubber components which have a predominantly aliphatic or nonaromatic character. Typically, such homogenizing agents comprise a blend of hydrocarbon resins, fatty acid esters, and napthenic oils. One particularly preferred example is the material available under the name STRUKTOL 40 MS (trademark) available from Struktol Canada Inc., Scarborough, Ontario, Canada. Preferably, at least about 1% by weight of the homogenizing agent is used in order to obtain an adequately homogenized blend. Desirably, the quantity of homogenizing agent used is not greater than about 10% by weight based on the total weight of the composition. Amounts greater than about 10% by weight do not appear to be necessary in order to achieve adequate homogenization, and tend to increase the costs of the composition unduly, and may adversely affect its physical properties. More preferably, the blend comprises about 1 to about 5% of said homogenizing agent.

The blend should also contain about 1% to about 10% by weight of at least one curing agent for uncured rubber. Any conventional curing agent or mixture of agents that are adapted to cure the uncured rubber or uncured rubbers mixture, may be used, for example a sulphur based or peroxide based curing agent. Such curing agents and their uses are well known to those skilled in the art, and need not be described in detail herein. Typically, the curing agent may be used together with accelerators, activators, antioxidant materials and pre-vulcanization inhibitors, in order to reduce the times and temperatures required to effect cure, to avoid or reduce oxidization of the rubbery material during cure at elevated temperature and avoid premature vulcanization. For example, it may be briefly mentioned that one form of curing agent may comprise sulphur powder, and may be used along with conventional accelerators, for example MBTS (2,2-dithiobis[ benzothiazole]), activators, such as zinc oxide and stearic acid, and antioxidants, such as, for example, phenylene diamine compounds.

The ingredients of the present composition may be blended together using mixing apparatus conventionally used for mixing or blending of rubber compounds. For example, the ingredients may be mixed together in a conventional dual paddle blender or in internal mixers such as Moriyama (trademark) or Banbury (trademark) mixers or Farrell (trademark) continuous mixers, or the like. The conditions, such as mixing speeds and times, required in order to achieve adequate homogenization of the blend may be readily determined by these of ordinary skill in the art by simple trial and experiment for any given mixture. The order in which the ingredients are added to the mixer is not especially critical, except that since, under the usual mixing conditions, the mixture reaches elevated temperatures approaching those at which cure may commence, desirably the curing agent is added after the remaining ingredients have been blended together to form a substantially homogenous blend, in order to avoid risk of premature curing of the composition. Usually, the blending of the ingredients will take place under conditions such that the temperature of the mixture does not exceed about 275° F.

The homogeneous polymer-modified blend of the invention may be molded and cured under conditions conventionally used for curing and molding rubber compositions. Typically, the blend is cured in a mold, under pressure, at a curing temperature of about 325° F. to about 375° F., for a period adequate to achieve the desired curing, typically of the order of about 5 minutes.

It is also contemplated that the blend may be extruded to form pellets that may then be used as a molding compound, to be molded and cured in the conventional manner, for example at temperatures and for times similar to those mentioned above.

As noted above, in forming the blends according to the invention, the styrene-based thermoplastic resin is substantially homogenously blended in the rubber components. In such a case, the styrene-based thermoplastic resin is effectively dissolved in the rubber components, with the result that, at least to the naked eye, particles of styrene-based thermoplastic resin are no longer visible in the mixture. In the preferred form, the mixture is made homogenous such that particles of styrene-based thermoplastic resin are not visible even under microscopy, such as scanning electron microscopy, preferably at powers of magnification up to 200X, still more preferably up to 750X and even more preferably up to 2000X.

The blended compositions of the invention may preferably include uncured natural rubber, in order to impart increased tear strengths to the cured compositions. In such case the quantity of natural rubber present may be about 5% to about 40% by weight, more preferably about 5% to about 30% by weight, based on the total weight of the composition.

Usually the compositions will include conventional reinforcing fillers or pigments, such as carbon black, silica or the like. These materials are well known to those skilled in the art and their nature and use need not be described in detail herein. Such fillers and pigments may be present in quantities of typically about 5% to about 30% by weight, more preferably about 10% to about 20% by weight, based on the total weight of the composition.

The compositions may also comprise conventional processing aids, such as plasticizers, lubricants, mold release agents and the like. For example the composition about 1% to about 15% of conventional rubber plasticizer such as conventional hydrocarbon oil based plasticizer, more preferably about 2% to about 10%, based on the total weight of the composition. Again, the nature of these materials and their use is well known to those skilled in the art and need not be described in detail herein. An example of an oil based plasticizer is FLEXON 395 (trademark) available from Esso Chemicals Canada (Imperial Oil Chemical Division), Toronto, Canada.

The compositions may also include small quantities of other conventional additives such as viscosity modifiers, e.g. trans-polyoctenamer rubber used for lowering the viscosity of the mixture to facilitate injection molding, and lubricants and wetting agents such as diethylene glycol. Typically these additives will together comprise less than about 10% by weight of the total composition weight.

Figure 2:
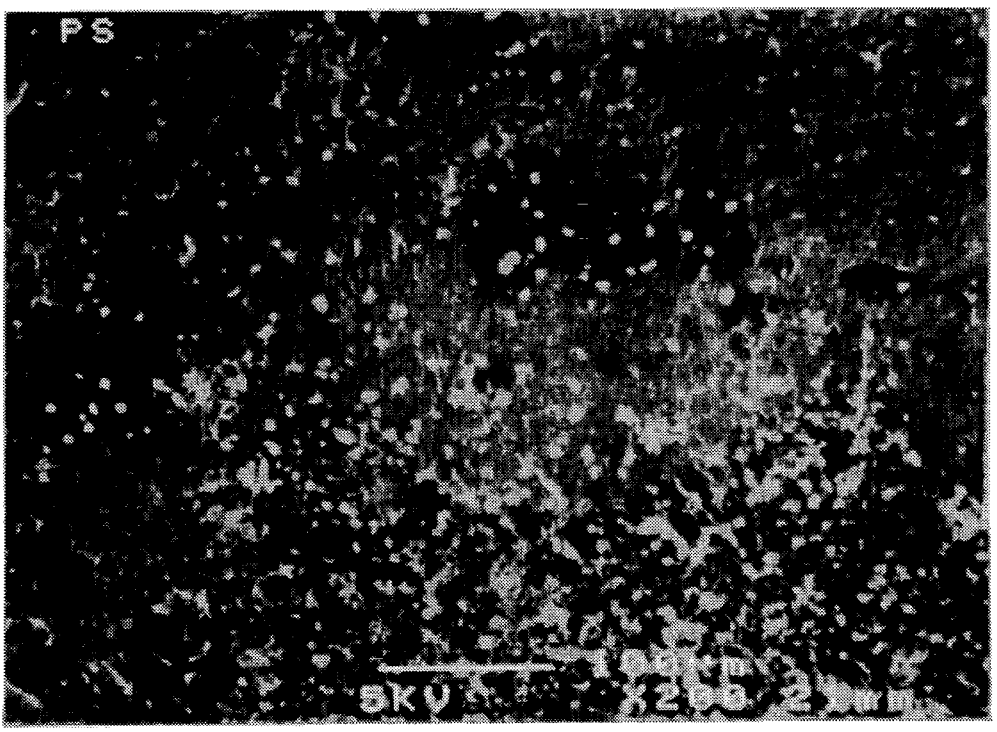
Figure 3:
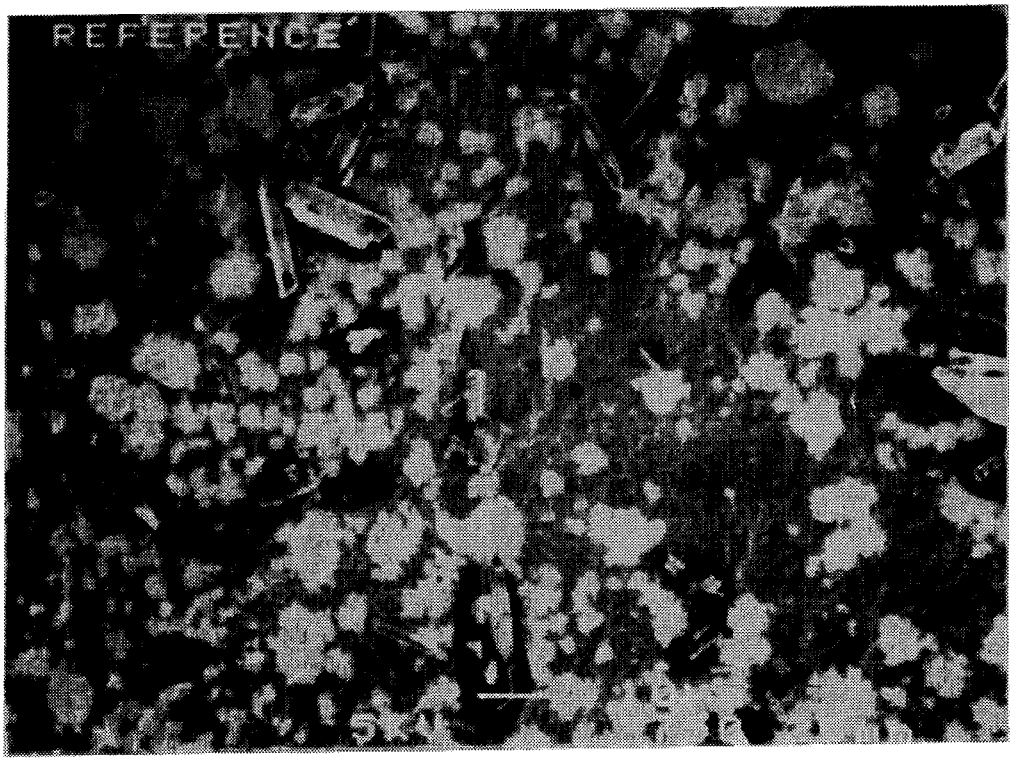
Figure 4:
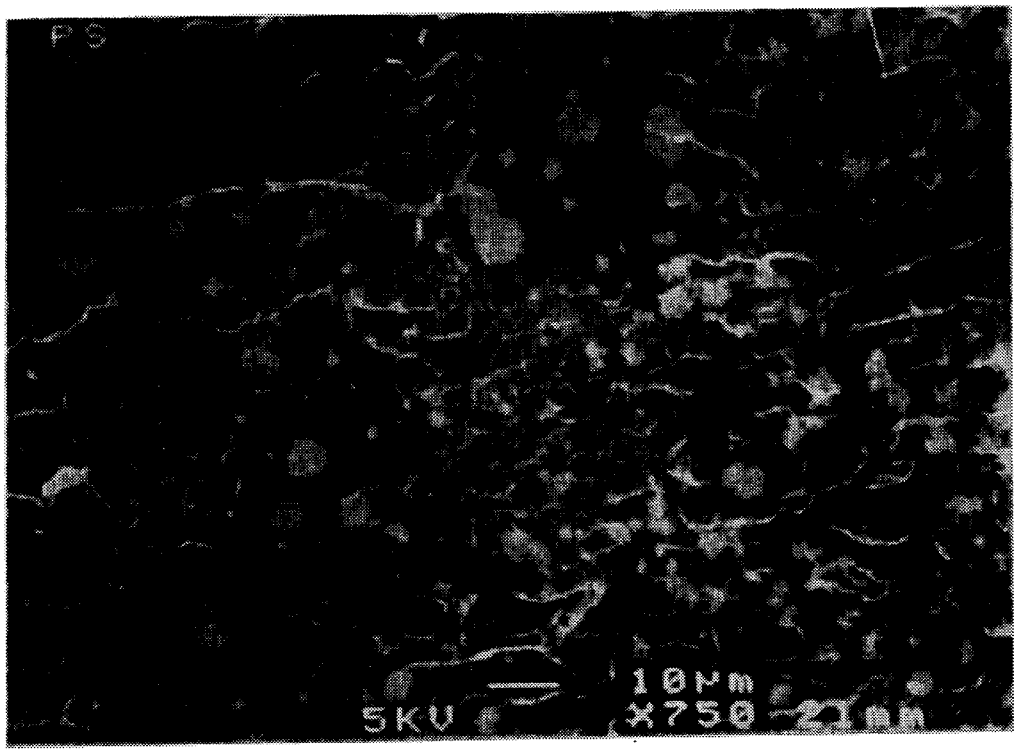
Figure 5:
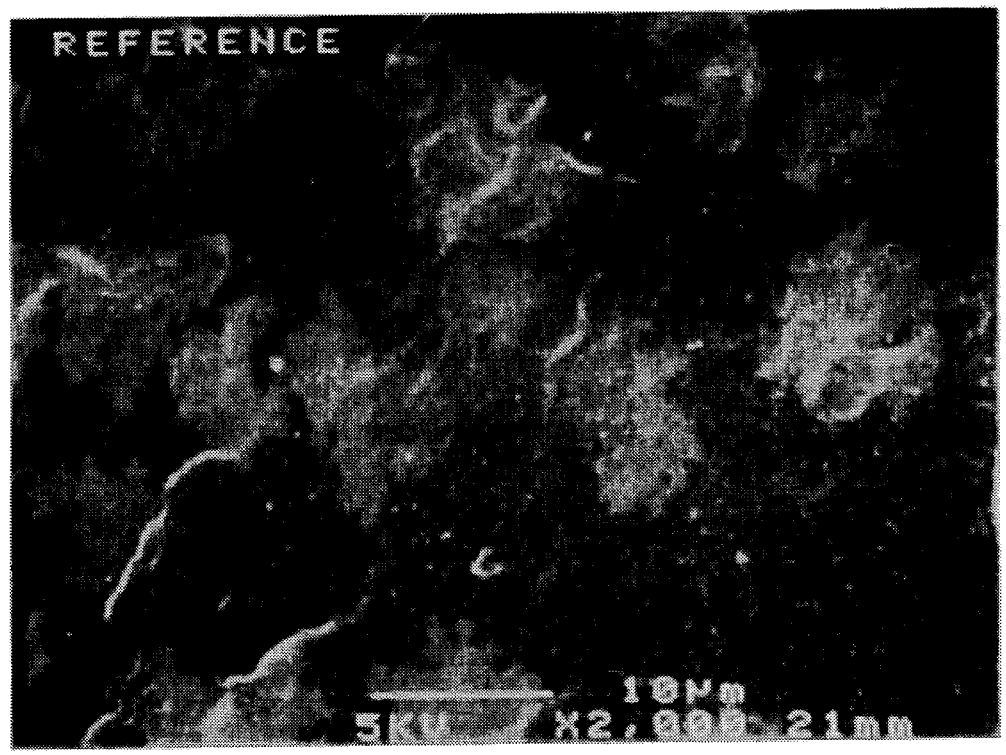
Figure 6:
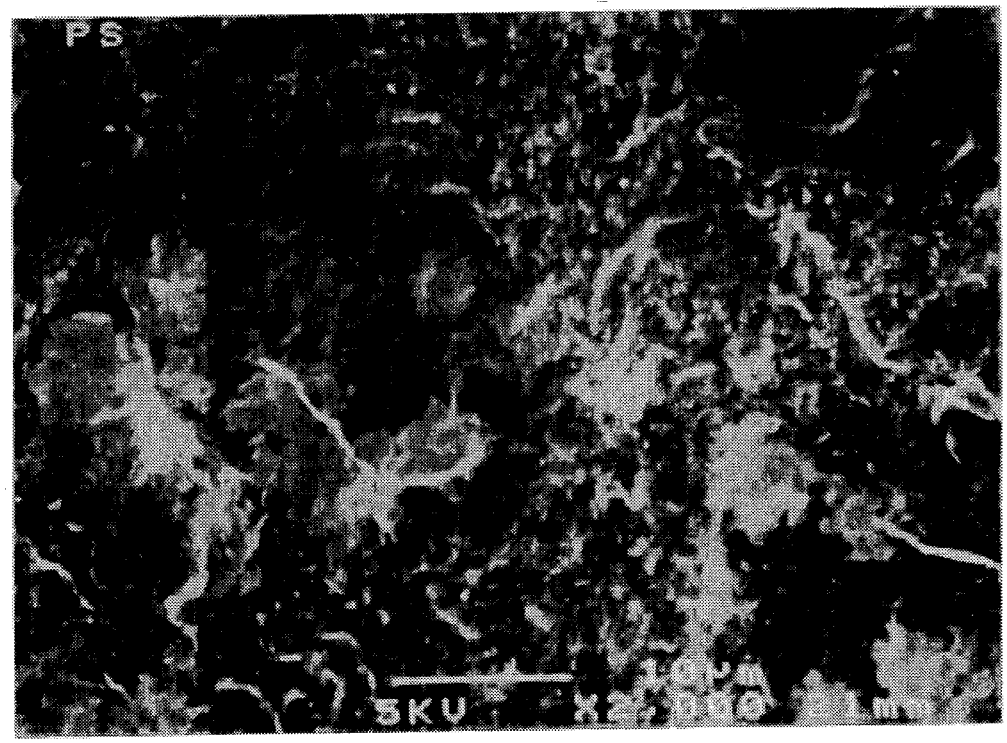

The invention is hereinafter described in more detail with reference in part to the accompanying drawings wherein:

FIGS. 1, 3 and 5 are scanning electron microscope microphotographic of rubber compositions, shown by way of comparison, at 200X, 750X and 2000X magnification, respectively, and FIGS. 2, 4 and 6 are similar microphotographs, at 200X, 750X and 2000X magnification, respectively, of polymer-modified compositions in accordance with the invention.

Although the above description provides ample information to those of ordinary skill in the art to make and use the polymer modified compositions of the invention, for the avoidance of doubt some detailed Examples will be given.

CPMARATIVE EXAMPLE 1

| Ingredients | Parts by weight |
| --- | --- |
| 30 mesh tire crumb | 30 |
| Uncured styrene-butadiene rubber compound | 25 |
| Low molecular weight 60% styrene 40% butadiene copolymer[1] | 10 |
| Trans-polyoctenamer rubber | 5 |
| Homogenizing agent[3] | 5 |
| Carbon black | 5 |
| Processing oil[4] | 15 |
| Cure package[5] | 5.0 |

Notes
[1]SS260 from Miles Polymer division, Rexdale, Ontario, Canada.
[2]VESTENAMER (trademark) from Huls Aktiengesellschaft, Marl, Germany.
[3]STRUKTOL 40MS from Struktol Canada Inc.
[4]FLEXON 393 (aromatic hydrocarbon oil) from Exxon Corporation.
[5]Mixture of zinc oxide, stearic acid, antioxidant (NAUGAUWHITE - Monsanto), sulfur, MBT (2-mercaptobenzothiazole), TMTD (tetramethylthiuram disulfide) and SANTOGARD (Monsanto) PVI (prevulcanization inhibitor) in a weight ratio 1:0.5:1:1:0.5:0.5:0.5.

PROCEDURE

The above ingredients, except the cure package, were placed in a MORIYAMA internal mixer and processed at high speed for approximately five minutes until the temperature of the mixture was approximately 280° F. The cure package was added and the mixing continued for approximately a further minute until a temperature of 300° F. was attained at which point the mixture was dumped from the mixer.

The mixture was calendered to form a flat sheet, and the sheet cured by maintaining it at 350° F. for 6 minutes.

EXAMPLE 1

Comparative Example 1 was repeated except 12.5 parts by weight of ground crystalline polystyrene and 12.5 parts by weight uncured styrene-butadiene rubber compound were substituted for the 25 parts by weight uncured styrene-butadiene rubber compound.

The cured sheet product of Example 1 was significantly stiffer than the cured product of Comparative Example 1, which was relatively soft and pliable.

The cured sheet products of Comparative Example 1 and of Example 1 were examined microscopically to determine homogeneity.

A corner of each sample was frozen in liquid nitrogen and snapped to expose a cross sectional face. The cross sectional faces of each of the two samples were mounted in duplicate on an aluminum specimen mount and gold coated prior to examination using a scanning electron microscope. An accelerating voltage of 5 kV was used at a working distance of approximately 21 mm. Secondary electron images were obtained using Polaroid type 55 P/N film.

Each sample was photographed at 200X, 750X and 2000X magnification. FIGS. 1, 3 and 5 show such photomicrographs for the product of Comparative Example 1, and FIGS. 2, 4 and 6 for the product of Example 1.

Each sample appeared to have white "islands" in a grey matrix which appeared to have been due to incomplete mixing of some of the solids components such as zinc oxide, antioxidant, or the like. There were more of the "islands" apparent on the reference sample (product of Comparative Example 1), suggesting better mixing in the polystyrene-containing sample (product of Example 1). Each sample had rod-like features sitting on the surfaces of the cross sectional faces which were apparently freeze-fracture artifacts, as they also had the appearance of white "islands" in a grey matrix.

No morphological evidence of crystalline polystyrene in the product of Example 1 sample was seen during the examination at magnifications that ranged from 20X up to 5,000X.

EXAMPLE 2

| Ingredients | Parts by weight |
| --- | --- |
| 30 mesh tire crumb | 30 |
| Natural rubber/carbon black master batch | 30 |
| Densified polystyrene foam | 15 |
| Uncured styrene-butadiene rubber compound | 15 |
| Processing oil[2] | 5 |
| Homogenizing agent[3] | 2.5 |
| Cure package[4] | 2.5 |

Notes
[1]A mixture of 15 parts by weight natural rubber and 15 parts by weight carbon black blended together in a BANBURY (trademark) mixer.
[2]FLEXON 395 from Exxon Corporation.
[3]STRUKTOL 40MS from Struktol Canada Inc.
[4]A mixture of sulfur powder, accelerator (MBTS), antioxidant (NAUGUARD Q from Uniroyal Chemical), zinc oxide and stearic acid in a weight ratio 4:1:1:8:4.

PROCEDURE

The ingredients were mixed, calendered and cured as in Comparative Example 1.

COMPARATIVE EXAMPLE 2

| Ingredients | Parts by weight |
| --- | --- |
| Pre-mix | |
| Uncured styrene-butadiene rubber | 2.52 |
| Carbon black | 1.02 |
| Processing oil[1] | 0.15 |
| Low mol. wt. 82.5% styrene 17.5% butadiene copolymer[2] | 5.12 |
| Zinc oxide | 0.18 |
| Stearic acid | 0.07 |
| Diethylene glycol | 0.11 |
| Silica flour | 1.83 |
| Accelerator[3] | 0.04 |
| Compound | |
| Friction compound[4] | 44.15 |
| Cured sbr −8 mesh | 11.04 |
| Fluff[5] | 22.07 |
| Cure package[6] | 0.67 |

Notes
[1]SUNDEX 790 (aromatic processing oil) from Exxon.
[2]PLIOLITE S6B, Goodyear Corporation.
[3]SANTOCURE NS, Monsanto Corporation.
[4]Mixture of tire cord and uncured styrene-butadiene and natural rubbers, obtained from the manufacture of passenger car tires.
[5]Tire cord fluff, obtained from recycling of road vehicle tires.
[6]As Example 2.

PROCEDURE

The pre-mix ingredients were mixed together in a water-cooled BANBURY mixer at high speed and dumped at 250° F. (approximately 6 mins. mixing). This mixture was then blended with the remaining compound ingredients, calendered and cured as in Comparative Example 2.

The cured products of Example 2 and Comparative Example 2 both had good stiffness properties at room temperature. The product of Comparative Example 2 had an unattractive appearance because of tire cord fibers visible on the surface of the product and was not amenable to tear trimming. The cured product of Example 2 had a satisfactory smooth black appearance.

When both were heated to above 150° F., the product of Comparative Example 2 became noticeably softer and more flexible, while the product of Example 2 exhibited relatively good stiffness retention and less deformation.

We claim:

1. A vulcanizable rubber composition formed by blending together:
   (a) about 5% to about 60% vulcanized styrene-butadiene rubber crumb;
   (b) about 5% to about 60% uncured rubber;
   about 5% to about 30% of a styrenic thermoplastic resin;
   (d) about 1% to about 10% homogenizing agent for facilitating physical mixing of aromatic with non-aromatic polymers; and
   (e) about 1% to about 10% curing agent for said uncured rubber;
   to form a blend wherein said thermoplastic resin (c) is substantially homogeneously blended with said rubbers (a) and (b); all said percentages by weight based on the total weight of the composition.

2. A composition as claimed in claim 1 wherein said blend contains about 10% to about 50% of said rubber crumb.

3. A composition as claimed in claim 1 wherein said blend contains about 20% to about 40% of said rubber crumb.

4. A composition as claimed in claim 1 wherein said crumb has a particle size of about 10 to about 80 mesh.

5. A composition as claimed in claim 1 wherein said blend contains about 10% to about 30% of said uncured rubber.

6. A composition as claimed in claim 5 wherein said blend contains about 10% to about 20% of said uncured rubber.

7. A composition as claimed in claim 1 wherein said uncured rubber comprises styrene-butadiene rubber.

8. A composition as claimed in claim 1 wherein said blend contains about 10% to about 25% of said styrenic thermoplastic resin.

9. A composition as claimed in claim 8 wherein said blend contains about 10% to about 20% of said styrenic thermoplastic resin.

10. A composition as claimed in claim 1 wherein said styrenic thermoplastic resin comprises polystyrene.

11. A composition as claimed in claim 10 wherein said polystyrene comprises foam polystyrene.

12. A composition as claimed in claim 1 wherein said blend contains about 1% to about 5% of said homogenizing agent.

13. A composition as claimed in claim 1 wherein said blend additionally contains:
    (f) about 5% to about 40% uncured natural rubber.

14. A composition as claimed in claim 13 wherein said blend contains about 5% to about 30% of said uncured natural rubber.

15. A composition as claimed in claim 1 additionally containing about 2% to about 10% rubber plasticizer.

16. A composition as claimed in claim 13 wherein said plasticizer comprises a hydrocarbon oil.

* * * * *